United States Patent [19]
Muller

[11] 4,196,414
[45] Apr. 1, 1980

[54] INTEGRAL TIRE INFLATION VALVE AND TIRE HEIGHT SENSOR

[75] Inventor: George H. Muller, Ann Arbor, Mich.

[73] Assignee: Ford Motor Company, Dearborn, Mich.

[21] Appl. No.: 968,944

[22] Filed: Dec. 13, 1978

[51] Int. Cl.² .............................................. B60C 23/06
[52] U.S. Cl. ...................................... 340/58; 340/539; 200/61.23; 73/146.8
[58] Field of Search ............... 340/58, 539; 200/61.22, 200/61.23, 61.25; 73/146.5, 146.8

[56] References Cited

U.S. PATENT DOCUMENTS

| | | | |
|---|---|---|---|
| 820,041 | 5/1906 | Ferdinand | 340/58 |
| 4,048,614 | 9/1977 | Shumway | 340/58 |
| 4,074,227 | 2/1978 | Kalmus | 340/58 |
| 4,117,452 | 9/1978 | Snyder et al. | 340/58 |
| 4,137,520 | 1/1979 | Deveau | 340/58 |

FOREIGN PATENT DOCUMENTS 2528352   1/1976   Fed. Rep. of Germany.

*Primary Examiner*—Alvin H. Waring
*Attorney, Agent, or Firm*—Paul K. Godwin, Jr.; Clifford L. Sadler

[57] ABSTRACT

A tire height warning system for use on vehicles employing pneumatic tires. The system includes a tire height sensor, mounted inside the inflation chamber of each monitored wheel of a vehicle, to detect low inflation or overload and responsively transmit an RF signal to a remote receiver for informing the vehicle operator of a potential tire failure. The tire height sensor is a unitary structure including an inflation value, a height probe and a self-powered RF transmitter compressibly mounted within a wheel adapted with a retaining clip.

9 Claims, 3 Drawing Figures

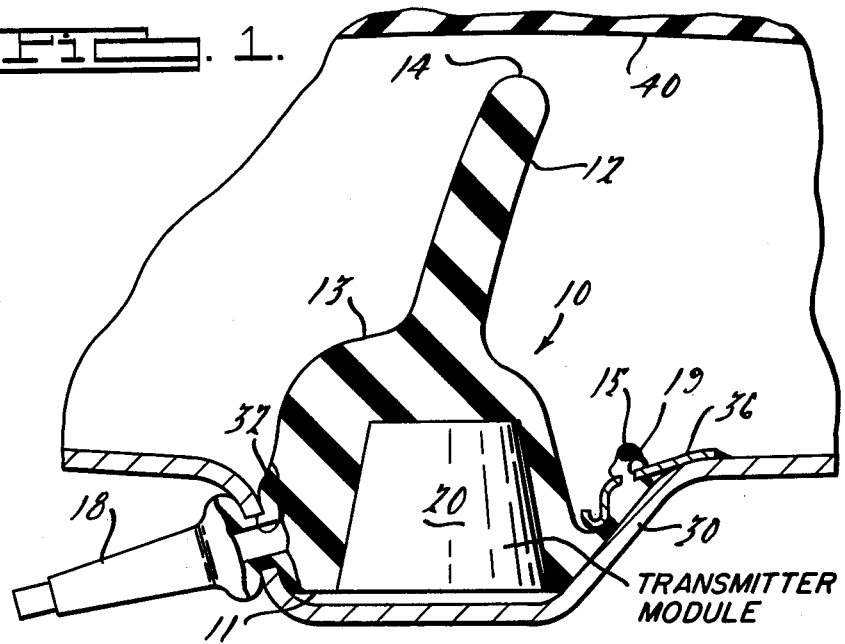
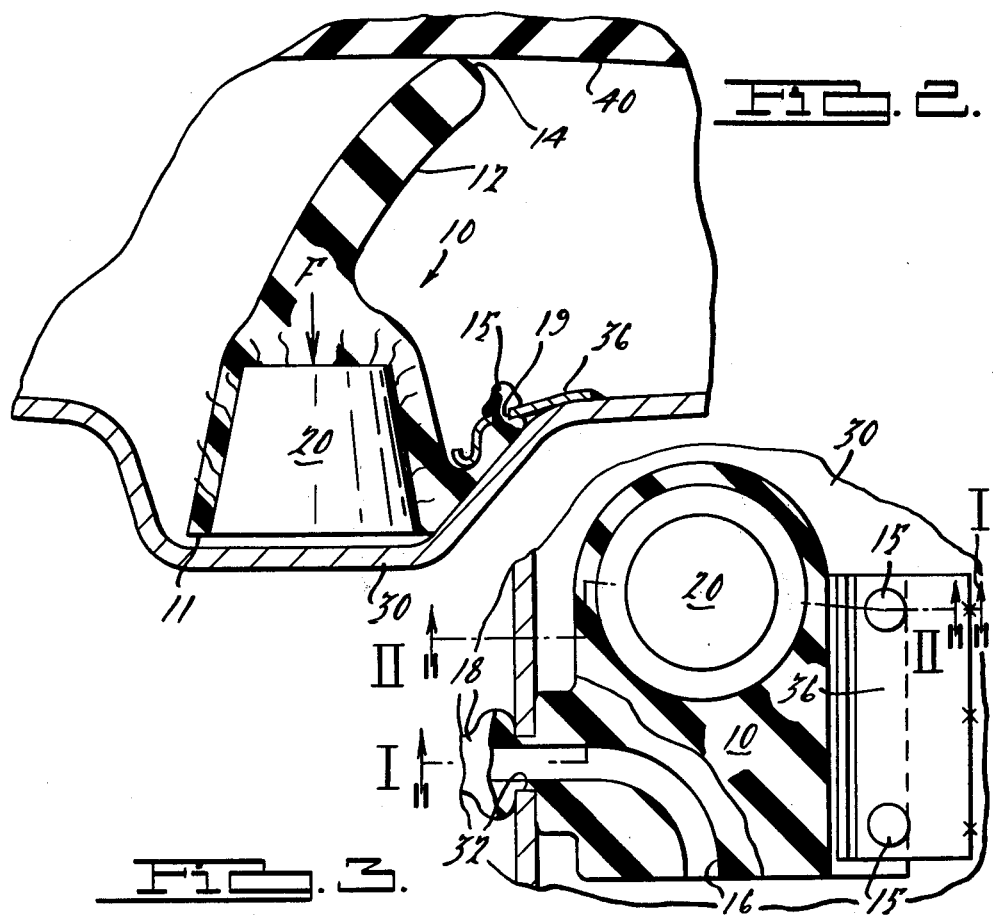

INTEGRAL TIRE INFLATION VALVE AND TIRE HEIGHT SENSOR

BACKGROUND OF THE INVENTION

1. Field of the Invention

The present invention relates to vehicle safety devices and more specifically, to pneumatic tire height sensors, as utilized in low tire warning systems.

2. Description of the Prior Art

Several systems have been developed which are used to monitor inflation pressures of pneumatic vehicle tires. In most cases, the systems require mechanical-electrical connections between the rotatable pneumatic tire and a remote electrical power source. Such systems require either an encapsulated gas reference volume or an atmosphere reference aperture in the wheel to measure inflation pressure. These systems have proved to be unreliable since they have to be detuned to accommodate the great variations in tire pressures that are normally encountered due to changing tire temperatures.

Other systems which provide warning indications to the vehicle operator, with respect to pneumatic tire failures, rely upon the measurement of the profile height of the tire at its contact point with the road surface. Such systems are generally preferred over pressure sensor systems since they are insensitive to changes in temperature and are able to determine when the inflation of a pneumatic tire decreases below a critical value. The profile height measuring systems are also effective to determine when the tires are overloaded.

One type of profile height measuring system, which has been found to be ideally suited for automotive vehicle use, utilizes a piezoelectric powered RF transmitter mounted in each wheel of a vehicle so as to transmit a signal that is received by a receiver mounted on the vehicle to indicate low tire height, when it occurs. An actuation device extends radially from the wheel towards the outer casing of the tire and compresses a piezoelectric crystal when the tire height is below a critical section height and the actuator is between the wheel and the road surface. In that system, when the tire is below a critical section height, a piezoelectric generator/transmitter is actuated once for each revolution of the wheel. It then sends a signal to a remote receiver. The receiver, in turn, produces an indication to the vehicle operator that a tire is below a critical height. The advantage of such a system is that it is self-contained and does not require internal battery sources or external power sources to be connected to the transmitter mounted within the wheel.

SUMMARY OF THE INVENTION

It is an object of the present inveniton to provide a unique tire height sensor module which is integral with an inflation valve so as to be readily and easily installed in a vehicle wheel by an operation that conforms to that of installing a conventional inflation valve.

The present invention is part of a transmitter/receiver tire height sensor system and comprises a unitary structure which is molded to incorporate a tire inflation valve, a self-powered RF transmitter module and a tire height probe. The tire height probe extends from the transmitter and causes the transmitter to generate an RF signal when the probe is compressed towards the transmitter module. The unitary structure is mounted within the inflation chamber of a pneumatic wheel/tire assembly so that the probe extends in a generally radial direction from the wheel towards the tread portion of the tire. Therefore, when the tire is deflated or overloaded below a predetermined height, the probe will be compressed towards the transmitter module once per wheel revolution.

The wheel for mounting the unitary structure includes a retaining clip located opposite a hole formed for the tire inflation valve. The retaining clip is positioned to engage the body of the unitary module and hold it in a fixed position.

BRIEF DESCRIPTION OF THE DRAWINGS

FIG. 1 is a cross-sectional plan view, taken along section line I—I, of the present invention shown in its normally mounted deactivated condition.

FIG. 2 is a cross-sectional plan view, taken along section line II—II, of the present invention in its normally mounted activated condition.

FIG. 3 is a cross-sectional view illustrating the unitary module with respect to the retaining clip.

DESCRIPTION OF THE PREFERRED EMBODIMENT

The unitary structure of the tire height sensor 10 of the present invention is shown in FIGS. 1, 2 and 3 mounted in a conventional vehicle wheel 30. The height sensor 10 is preferably molded of a heavy rubber material, as a single unit, which has an integral inflation valve stem 18 extending from a main body 13 and a compressibly responsive transmitter module 20. The sensor 10 also includes an air passage 16, which extends from the valve stem 18 through the main body 13. A base portion 11 of the height sensor 10 is molded to conform to the cross-sectional shape of the wheel 30 so as to be compressibly and tightly fitted therein. A retaining clip 36 is spotwelded to the inside of the wheel 30 and extends towards an oppositely located inflation hole 32. A plurality of apertures 19 are located in the retaining clip 36 and are adapted to receive flanged proturberances 15 which extend from the main body 13 of the height sensor 10. In this manner, the height sensor 10 is compressibly held in place so as to withstand the severe centrifugal forces, which under normal vehicle operating conditions tend to pull the sensor away from the wheel 30. A sensing probe 12 is also formed of hardened rubber and extends from the main body 13 towards the peripheral tread portion of the mounted tire 40.

In FIG. 1, the tip 14 of the probe 12 is shown in a normal position and the tire 40 is indicated to be inflated above a predetermined minimum amount so as to not be contacting the tip 14 of the probe 12 when the probe is between the wheel 30 and the road surface. In this configuration, as the wheel/tire assembly turns, the probe is not contacted and no compressive forces act against the transmitter module 20.

FIG. 2 illustrates the interaction of the tire 40, when it is inflated or overloaded so as to be below a predetermined profile height and the probe 12 is between the wheel 30 and the road surface. The tire 40 contacts the tip 14 of the probe 12 and forces it towards the wheel 30. When this occurs, a compression force "F" is applied through the probe 12 to the piezoelectric transmitter module 20. The piezoelectric generator/transmitter module 20 then responsively generates an RF signal which is received by a remote receiver (not shown), which indicates a tire failure to the vehicle operator.

Due to the fact that the height sensor 10 of the present invention is formed to include the inflation valve 18 and flanged protuberances 15 in opposite locations a unit is provided which is easily installed by a method that is quite similar to the installation of a conventional inflation valve prior to mounting the tire 40 on the rim 30. In the installation operation, the flanged protuberances 15 are aligned with the underside of the corresponding holes 19 in the retaining clip 36. The protuberances 15 are forced upwards through the corresponding holes and the base 11 is rotated towards the wheel 30. The valve stem 18 is then aligned with the inflation hole 32 and pushed through hole 32. Valve 18 is then drawn through the hole 32 until the expanded portion of the valve stem is outside of the hole 32, to effect a seal.

Of course, it is understood that a counterweight (not shown) should be installed on the opposite side of the wheel in order to effect a balance. However, due to the novel mounting techniques employed for the present sensor 10, the counterweight need not be removed each time the sensor 10 is removed and replaced. This is in contrast to other systems which may employ a steel banding technique to commonly mount the sensor and counterweight on opposite sides of the wheel.

It will be apparent that many modifications and variations may be effected without departing from the scope of the novel concept of this invention. Therefore, it is intended by the appended claims to cover all such modifications and variations which fall within the true spirit and scope of the invention.

I claim:

1. In a low profile height warning system for use on an inflatable pneumatic tire of a vehicle including:
    a wheel having a rim for mounting said inflatable pneumatic tire;
    a tire inflation valve extending through said wheel;
    an RF transmitter mounted on said wheel within said tire;
    and a tire height sensor probe extending from said transmitter towards the outermost periphery of said tire, wherein said transmitter includes a piezoelectric power source responsive to said probe contacting said tire when the profile height of said tire is below a predetermined value;
    an improvement comprising:
    said inflation valve, said transmitter and said probe being molded as a single integral structure.

2. In an electrically isolated low tire profile warning system including:
    a pneumatic tire having an inflation chamber and mounting beads;
    a wheel having a circular rim, for mounting said tire by said beads, and having an aperture therein for communicating with said tire inflation chamber;
    an inflation valve extending through said wheel aperture;
    a tire height sensor probe within said inflation chamber of said mounted tire extending from said wheel toward said tread;
    a radio energy transmitter mounted within said probe;
    an improvement comprising:
    said valve, said probe and said transmitter being molded as a unitary structure.

3. An improved low tire warning system as in claim 2, wherein said transmitter includes a piezoelectric power source responsive to said probe contacting said tire when the profile height of said tire is below a predetermined value.

4. An improved low tire warning system as in claim 3, wherein said unitary structure includes an uninterrupted air passage from said valve to said inflation chamber of said tire.

5. An improved low tire warning system as in claim 3, wherein said wheel further includes a clip extending from said wheel rim to compressibly engage and hold said structure against said rim.

6. A unitary molded structure for mounting on the internal rim of a wheel having an inflation aperture and a retaining clip comprising:
    means defining a base portion formed to conform to the internal rim of said wheel;
    means defining an inflation valve portion extending from said base portion means for insertion through said inflation aperture;
    means defining a compressible portion extending from said base portion means for compressible retention by said clip; and
    means defining a flexible probe extending radially from said base portion means.

7. A unitary molded structure as in claim 6, further including means connected to said flexible probe means for responsively generating electromagnetic radiation.

8. A unitary molded structure as in claim 7, included in a low profile height tire warning system, wherein a pneumatic tire is mounted on said wheel and said generating means responds to said flexible probe means contacting the inside wall of said tire, when said tire height is below a predetermined value, by transmitting an RF energy signal.

9. A unitary molded structure as in claim 8, wherein said generating means includes a piezoelectric power source responsive to said flexible probe means contacting said tire.

* * * * *